(12) United States Patent
Yamamoto

(10) Patent No.: US 7,693,417 B2
(45) Date of Patent: Apr. 6, 2010

(54) OPTICAL OPTION ATTACHMENT RING

(75) Inventor: Shigeru Yamamoto, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 365 days.

(21) Appl. No.: 11/730,048

(22) Filed: Mar. 29, 2007

(65) Prior Publication Data

US 2007/0230951 A1 Oct. 4, 2007

(30) Foreign Application Priority Data

Mar. 31, 2006 (JP) ............................ 2006-099995

(51) Int. Cl.
*G03B 11/00* (2006.01)
(52) U.S. Cl. .................. 396/544; 359/818; 248/229.1
(58) Field of Classification Search .............. 396/544; 359/818; 348/375; 248/223.14, 229.1, 229.13, 248/229.15; *H04N 5/225; G02B 7/02*
See application file for complete search history.

(56) References Cited

U.S. PATENT DOCUMENTS 3,987,680 A * 10/1976 Naoi et al. ................. 74/10.54
5,647,743 A * 7/1997 Schmitt ........................ 433/23
6,308,013 B1 * 10/2001 Tanaka et al. ................. 396/74
7,042,660 B2 * 5/2006 Sugita et al. ................ 359/818
2005/0237635 A1 10/2005 Sugita et al.

FOREIGN PATENT DOCUMENTS

| JP | 10-186202 A | 7/1998 |
| JP | 2004-109717 A | 4/2004 |
| JP | 2004-271892 A | 9/2004 |
| JP | 2005-17375 A | 1/2005 |

\* cited by examiner

*Primary Examiner*—Melissa J Koval
*Assistant Examiner*—Linda B Smith
(74) *Attorney, Agent, or Firm*—Birch, Stewart, Kolasch & Birch, LLP

(57) ABSTRACT

The optical option attachment ring of the present invention includes a rotator having an abutting surface that projects inward from the inner circumferential surface of the ring body and abuts the front end of the lens barrel as well as an arcuate portion that follows the upper end of the abutting surface. The optical option attachment ring further includes a resilient member that applies an urging force to the rotator to rotate in the direction opposite to the above-mentioned rotation direction and a stopper that abuts at least one of the one end and the other end so as to restrict the rotation caused by the urging force of the resilient member.

4 Claims, 6 Drawing Sheets

OPTICAL OPTION ATTACHMENT RING

BACKGROUND OF THE INVENTION

1. Field of the Invention

The present invention relates to an optical option attachment ring, and particularly to an optical option attachment ring that will not disengage until and after a fastening screw is tightened.

2. Description of the Related Art

There has been conventionally known an optical option attachment ring for mounting a wide-converter, a tele-converter or the like to a lens barrel (see Japanese Patent Application Laid-Open No. 2004-271892, for example).

The optical option attachment ring described in Japanese Patent Application Laid-Open No. 2004-271892 will be explained with reference to the drawings. As shown in FIG. 9, the optical option attachment ring 10' includes one end 21' and the other end 22' disposed with a predetermined gap therebetween, a ring body 20' that connects the one end 21' to the other end 22' and receives a lens barrel (not shown), and a fastening screw 23' that is inserted into screw holes 21a' and 22a' that pass through the one end 21' and the other end 22'. The optical option attachment ring is configured such that tightening the fastening screw 23' brings the one end 21' and the other end 22' closer to each other and hence the diameter of the ring body 20' decreases so that the optical option attachment ring 10' is fastened to the lens barrel, while loosing fastening screw 23' separates the one end 21' and the other end 22' from each other and hence the diameter of the ring body 20' increases so that the optical option attachment ring 10' disengages from the lens barrel.

As shown in FIG. 9, the one end 21' and the other end 22' of the optical option attachment ring 10' have inclined portions, and tightening the fastening screw 23' moves a part 22b' of the other end 22' along the inclined surface of the one end 21', so that the part 22b' projects inward from the inner circumferential surface 20a' of the ring body 20' and is situated (engaged) in a groove (now shown) formed in the lens barrel. This prevents the optical option attachment ring 10' from disengaging from the lens barrel even if the fastening screw 23' loosens.

SUMMARY OF THE INVENTION

However, in the optical option attachment ring 10' described in Japanese Patent Application Laid-Open No. 2004-271892, since the other end 22' will be situated (engaged) in the groove formed in the lens barrel only when the fastening screw 23' is tightened, there is a problem that this configuration cannot prevent the disengagement of the optical option attachment ring 10' until the fastening screw 23' is tightened.

The present invention has been made in view of such circumstances and aims to prevent disengagement of the optical option attachment ring until and after the fastening screw is tightened.

The present invention has been made to solve the above problem. A first aspect of the present invention is an optical option attachment ring including one end and the other end disposed with a predetermined gap therebetween, a ring body that connects the one end to the other end and receives a lens barrel, and a fastening screw that is inserted into screw holes that pass through the one end and the other end. The optical option attachment ring is configured such that tightening the fastening screw brings the one end and the other end closer to each other and hence the diameter of the ring body decreases so that the optical option attachment ring is fastened to the lens barrel, while loosening the fastening screw separates the one end and the other end from each other and hence the diameter of the ring body increases so that the optical option attachment ring disengages from the lens barrel. The optical option attachment ring further includes a rotator having an abutting surface that projects inward from the inner circumferential surface of the ring body and abuts the front end of the lens barrel as well as an arcuate portion that follows the upper end of the abutting surface. When the lens barrel is inserted into the ring body and moved to a predetermined position, the front end of the lens barrel abuts the abutting surface and the front end of the lens barrel moves relative to the abutting surface so as to rotate the rotator, so that the abutting surface and the arcuate portion are situated outside the inner circumferential surface of the ring body. The optical option attachment ring further includes a resilient member that applies an urging force to the rotator such that the rotator rotates in the direction opposite to the above-mentioned rotation direction, and a stopper that abuts at least one of the one end and the other end so as to restrict the rotation caused by the urging force of the resilient member. When the lens barrel is inserted into the ring body and moved to the predetermined position, the urging force of the resilient member rotates the rotator so that the abutting surface and the arcuate portion are situated in a groove formed in the lens barrel.

According to the first aspect, when the lens barrel is inserted into the ring body and moved to the predetermined position (intended mounting position), the urging force of the resilient member counter-rotates the rotator so that the abutting surface and the arcuate portion will be situated in the groove formed in the lens barrel. That is, the arcuate portion engages the groove. It is therefore possible to prevent the disengagement of the optical option attachment ring until and after the fastening screw is tightened.

A second aspect of the present invention is the optical option attachment ring according to the first aspect configured such that the rotator is provided with an opening into which the fastening screw is inserted, and the rotator is disposed between the one end and the other end and rotatably held around the inserted fastening screw.

According to the second aspect, since the fastening screw also serves as the axis of rotation of the rotator, there is no need to separately provide an axis of rotation of the rotator.

A third aspect of the present invention is the optical option attachment ring according to the first or second aspect configured such that the rotator has a small arcuate portion that follows the lower end of the abutting surface and is smaller than the arcuate portion.

According to the third aspect, it is relatively easily possible to configure the rotator.

According to the present invention, it is possible to prevent the disengagement of the optical option attachment ring until and after the fastening screw is tightened.

DETAILED DESCRIPTION OF THE PREFERRED EMBODIMENTS

A preferred embodiment of the optical option attachment ring according to the present invention will be described below with reference to the accompanying drawings.

Figure 1:
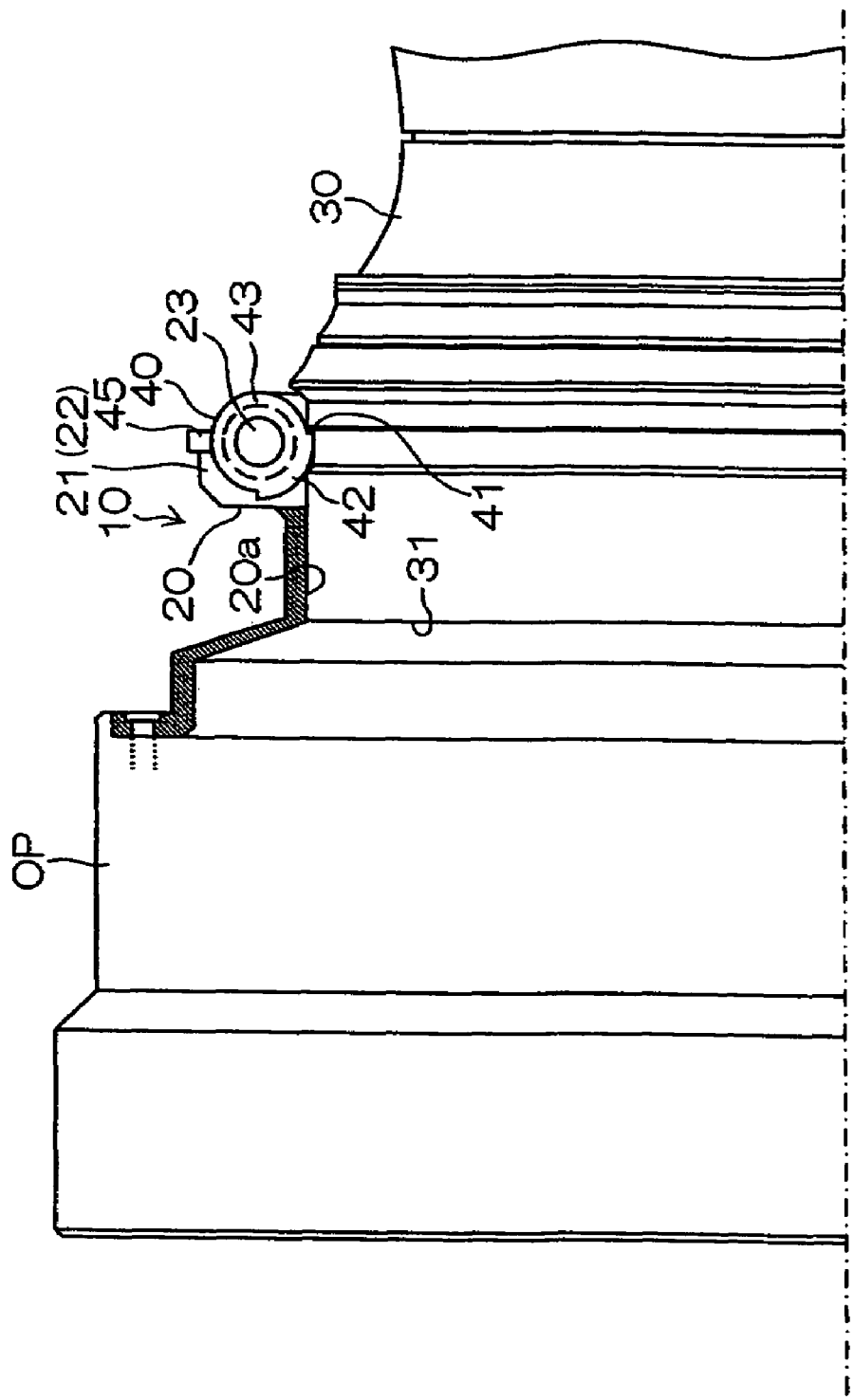
FIG. 1 is a view for explaining the configuration of the optical option attachment ring according to the present invention.
Figure 2:
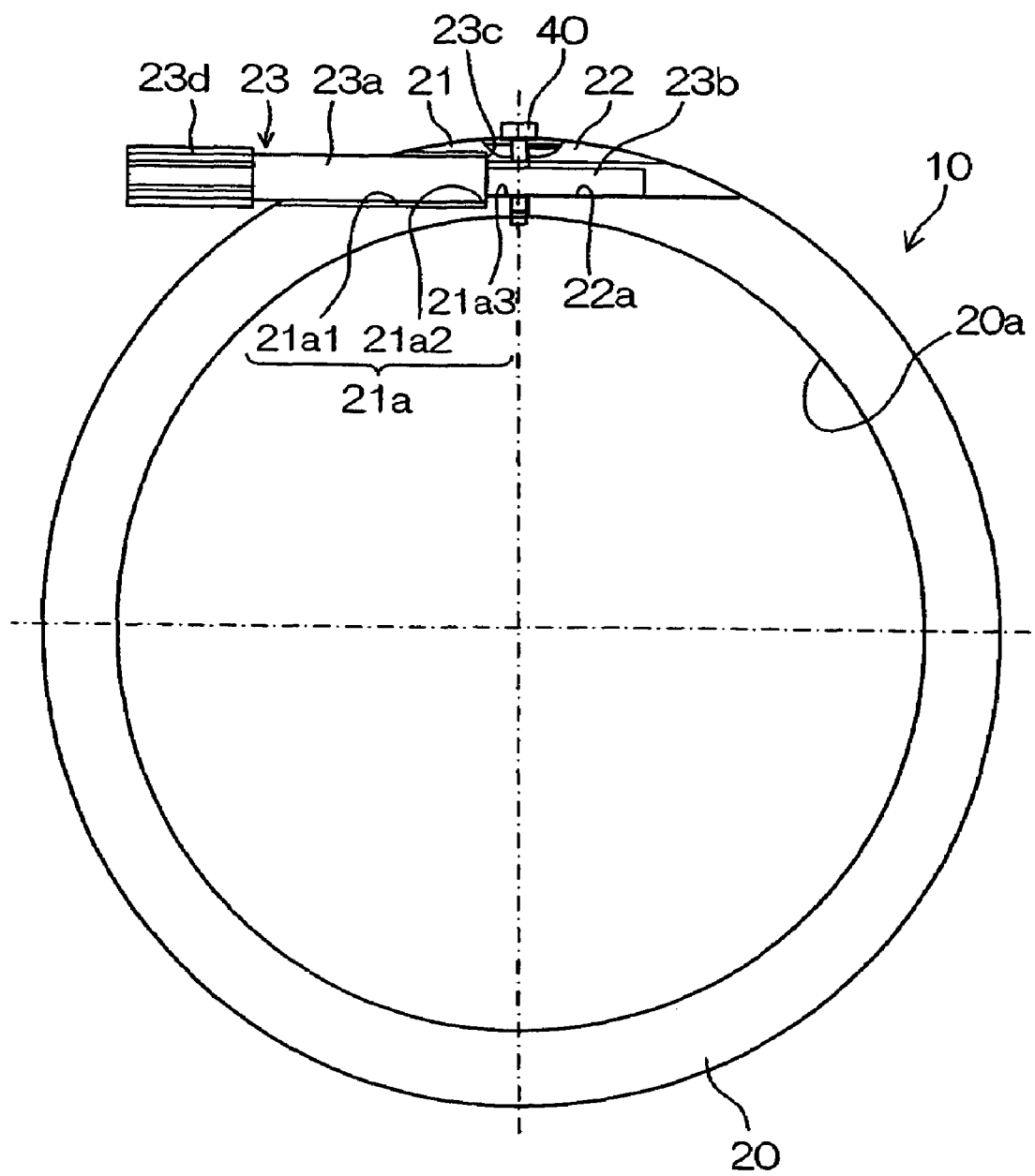
FIG. 2 is a view for explaining the configuration of the optical option attachment ring according to the present invention.

FIGS. 1 and 2 explain the configuration of the optical option attachment ring according to the present invention.

As shown in FIG. 1, an optical option attachment ring 10 is a structure for mount an optical option OP, such as a wide-converter and a tele-converter, to a lens barrel 30. As shown in FIG. 2, the optical option attachment ring 10 includes one end 21 and the other end 22 disposed with a predetermined gap therebetween and a ring body 20 that connects the one end 21 to the other end 22.

The inner diameter of the ring body 20 is designed to be slightly larger than the outer diameter of (the front end of) the lens barrel 30, so that the lens barrel 30 can be inserted into the ring body 20 and moved to a predetermined position (intended mounting position).

As shown in FIG. 2, the one end 21 and the other end 22 are provided with screw holes 21a and 22a that pass through the one end 21 and the other end 22. A fastening screw 23 is inserted into the screw holes 21a and 22a.

The screw hole 21a in the one end 21 includes a large-diameter hole 21a1, a step 21a2 that follows the large-diameter hole 21a1 and a small-diameter hole 21a3 that follows the step 21a2. When the fastening screw 23 is inserted into the screw hole 21a, a screw body 23a of the fastening screw 23 is situated in the large-diameter hole 21a1, and a threaded portion 23b formed on one end of the screw body 23a is situated in the small-diameter hole 21a3. A step 23c is formed at the boundary between the screw body 23a and the threaded portion 23b. When the fastening screw 23 is inserted into the screw hole 21a, the step 23c abuts the step 21a2 of the screw hole 21a, so that the step 23c prevents the fastening screw 23 from being inserted any further. On the other hand, a thread groove in which the threaded portion 23b of the fastening screw 23 is screwed is formed in a threaded hole 22a in the other end 22.

Therefore, when a knob 23d of the fastening screw 23 is rotated in the direction in which the fastening screw 23 is tightened, the one end 21 and the other end 22 are brought relatively closer to each other, so that the diameter of the ring body 20 decreases. Thus, the optical option attachment ring 10 is fastened to the lens barrel 30.

On the other hand, when the knob 23d of the fastening screw 23 is rotated in the direction in which the fastening screw 23 is loosened, the one end 21 and the other end 22 are relatively separated from each other, so that the diameter of the ring body 20 increases. Thus, the diameter of the optical option attachment ring 10 returns to its initial value. That is, the optical option attachment ring 10 is unfastened from the lens barrel 30.

A configuration for preventing the thus configured optical option attachment ring 10 from disengaging from the lens barrel will now be described.

To prevent the disengagement, the optical option attachment ring 10 includes an anti-disengagement member 40 (corresponding to a rotator of the present invention).

The anti-disengagement member 40 can be made of, for example, polyacetal resin (POM), Teflon® or other synthetic resins.

As shown in FIG. 1, the anti-disengagement member 40 is a plate-like member and includes an abutting surface 41 that abuts the front end 31 of the lens barrel 30 when the lens barrel 30 is inserted. A large-diameter portion 42 (corresponding to an arcuate portion of the present invention) is provided such that it follows the upper end of the abutting surface 41, while a small-diameter portion 43 is provided such that it follows the lower end of the abutting surface 41.

Figure 3:
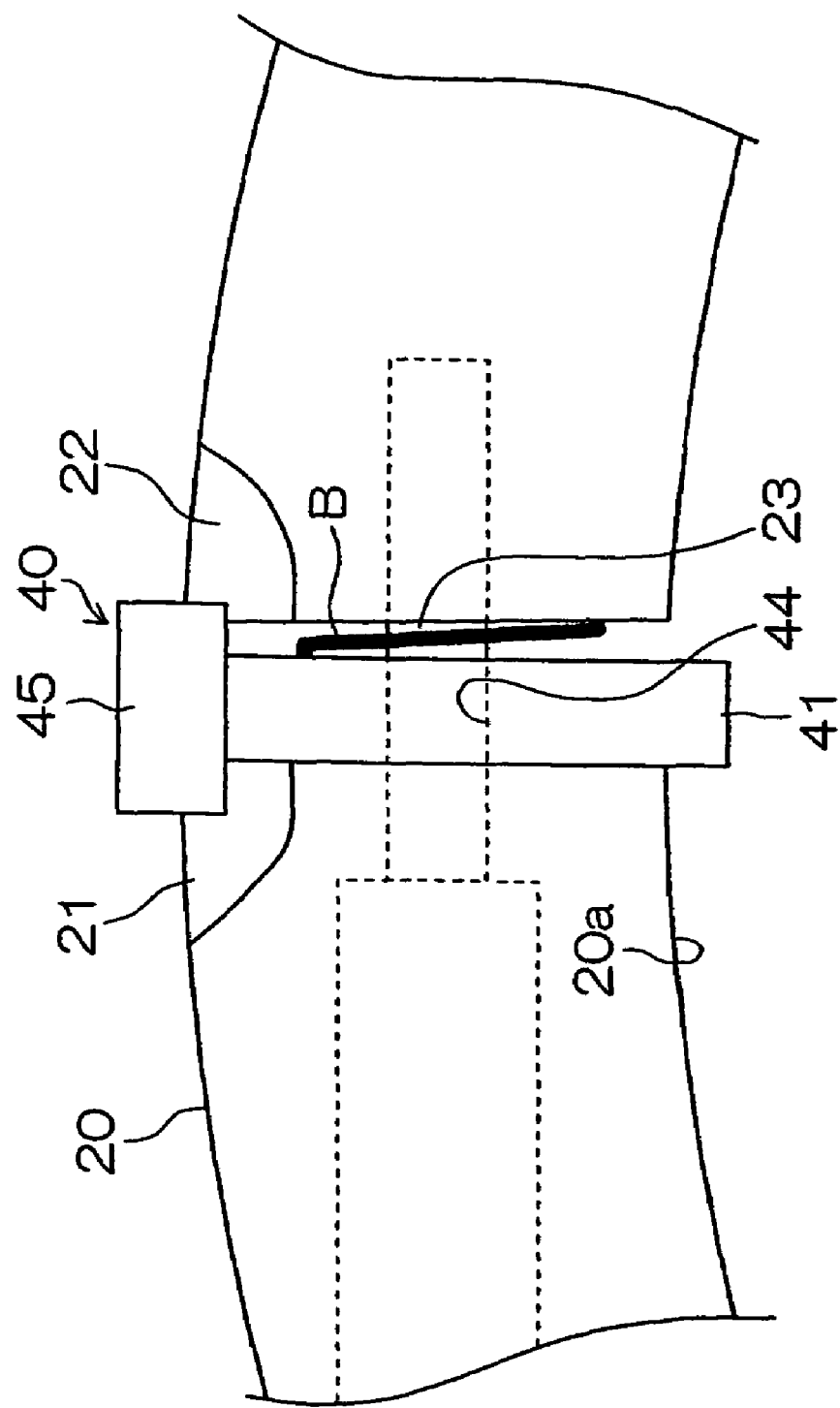
FIG. 3 is a view for explaining the configuration of an anti-disengagement member.

As shown in FIG. 3, the anti-disengagement member 40 is disposed between the one end 21 and the other end 22, and the fastening screw 23 is inserted into an opening 44 formed at the center of the anti-disengagement member 40 to rotatably hold the anti-disengagement member 40 around the fastening screw 23. Since the fastening screw 23 also serves as the axis of rotation of the anti-disengagement member 40, there is no need to separately provide an axis of rotation of the anti-disengagement member 40.

Figure 4:
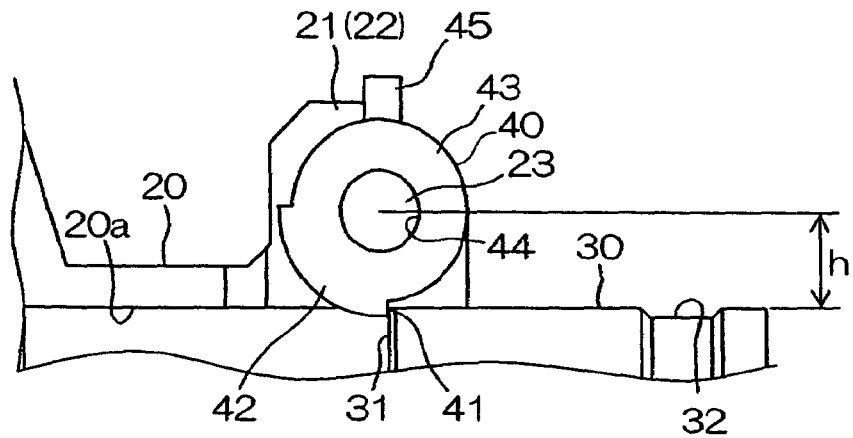
FIG. 4 is a view for explaining the configuration of the anti-disengagement member.

The anti-disengagement member 40 is connected to the other end 22 via a resilient member B (for example, part of a coil spring). The resilient member B is a member for applying an urging force to the anti-disengagement member 40 such that the anti-disengagement member 40 is rotated counter-clockwise in FIG. 1. However, the anti-disengagement member 40 is provided with a stopper 45, and the stopper 45 abuts the one end 21 and the other end 22, restricting the rotation of the anti-disengagement member 40 caused by the resilient member B. As shown in FIG. 4, when the stopper 45 abuts the one end 21 and the other end 22, the large-diameter portion 42 (and the abutting surface 41) projects inward from the inner circumferential surface 20a of the ring body 20. That is, the radius of the large-diameter portion 42 is designed to be larger than the distance h from the center of rotation of the anti-disengagement member 40 to the inner circumferential surface 20a of the ring body 20.

Figure 5:
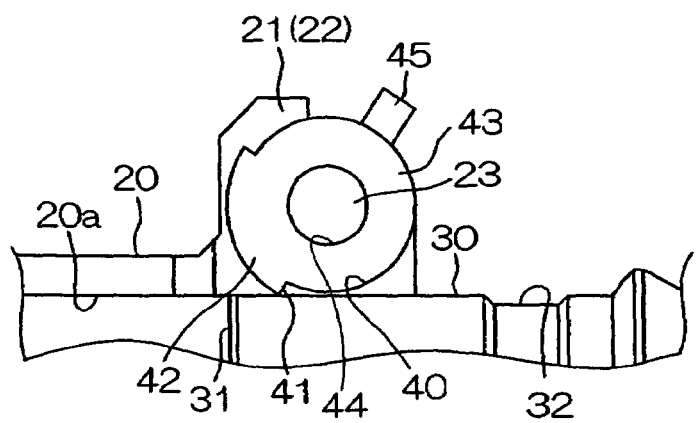
FIG. 5 is a view for explaining the configuration of the anti-disengagement member.

On the other hand, when the lens barrel 30 is inserted into the ring body 20 and moved to the predetermined position (intended mounting position), the front end 31 of the lens barrel 30 abuts the abutting surface 41 and the front end 31 of the lens barrel 30 moves relative to the abutting surface 41. This rotates the anti-disengagement member 40 clockwise in FIG. 4, so that the large-diameter portion 42 (and the abutting surface 41) is situated outside the inner circumferential surface 20a of the ring body 20, as shown in FIG. 5. At this point, the small-diameter portion 43 is situated outside the inner circumferential surface 20a of the ring body 20 and hence does not project inward from the inner circumferential surface 20a of the ring body 20. That is, the radius of the small-diameter portion 43 is designed to be smaller than (or equal to) the distance h from the center of rotation of the anti-disengagement member 40 to the inner circumferential surface 20a of the ring body 20.

Figure 6:
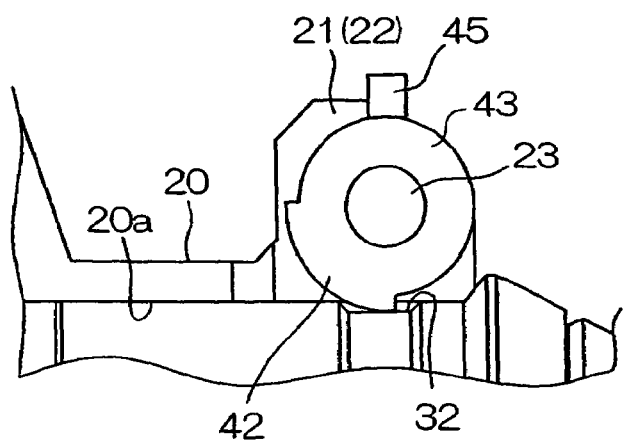
FIG. 6 is a view for explaining the configuration of the anti-disengagement member.

Then, when the ring body 20 is moved to the predetermined position (intended mounting position) (that is, when the abutting surface 41 reaches a groove 32 of the lens barrel), the urging force of the resilient member rotates the anti-disengagement member 40 counterclockwise in FIG. 5 and the stopper 45 abuts the one end 21 and the other end 22 (or may abut one of the one end 21 and the other end 22), so that the rotation of the anti-disengagement member 40 is restricted. Thus, as shown in FIG. 6, the large-diameter portion 42 (and the abutting surface 41) projects inward from the inner circumferential surface 20a of the ring body 20. That is, the large-diameter portion 42 (and the abutting surface 41) is situated in the groove 32 formed in the lens barrel 30 and the large-diameter portion 42 engages the groove 32. It is therefore possible to prevent the disengagement of the optical option attachment ring 10 until the fastening screw 23 is tightened.

Figure 7:
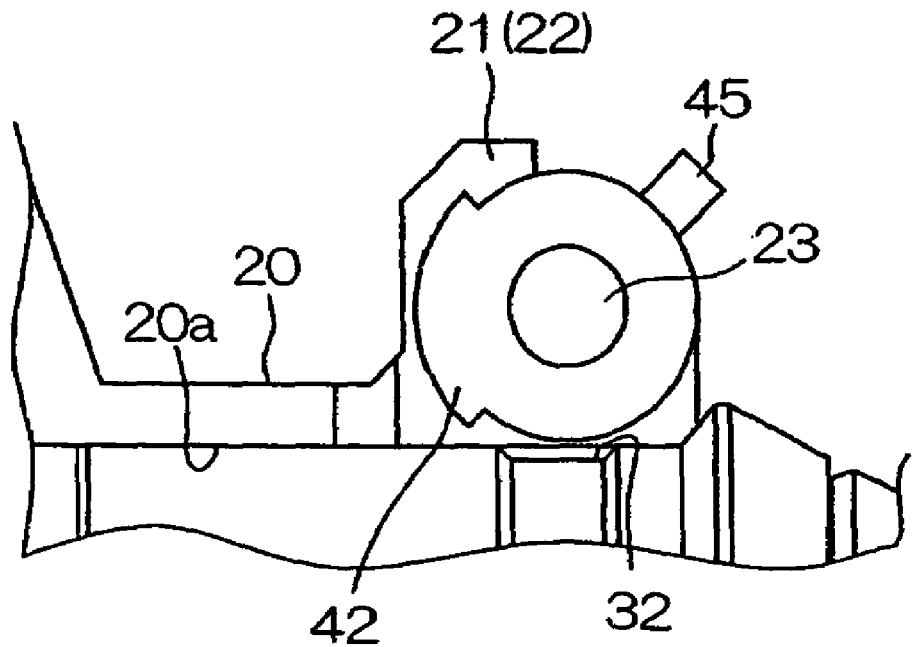
FIG. 7 is a view for explaining the configuration of the anti-disengagement member.

By grabbing and manipulating the stopper 45 by a finger to rotate the anti-disengagement member 40 clockwise in FIG. 6 so as to allow the large-diameter portion 42 (and the abutting surface 41) to be situated outside the inner circumferential surface 20a of the ring body 20 as shown in FIG. 7, the optical option attachment ring 10 can be removed. That is, the stopper 45 restricts the rotation of anti-disengagement member 40 and also serves as a disengagement manipulation member for removing the attachment ring 10 from the lens barrel 30.

As described above, according to the optical option attachment ring 10 of this embodiment, after the lens barrel 30 is inserted into the ring body 20 and moved to the predetermined position (intended mounting position), the urging force of the resilient member rotates the anti-disengagement member 40 clockwise, so that the large-diameter portion 42 (and the abutting surface 41) will be situated in the groove 32 formed in the lens barrel 30. That is, the large-diameter portion 42 engages the groove 32. It is therefore possible to prevent the disengagement of the optical option attachment ring 10 until the fastening screw 23 is tightened.

Figure 8:
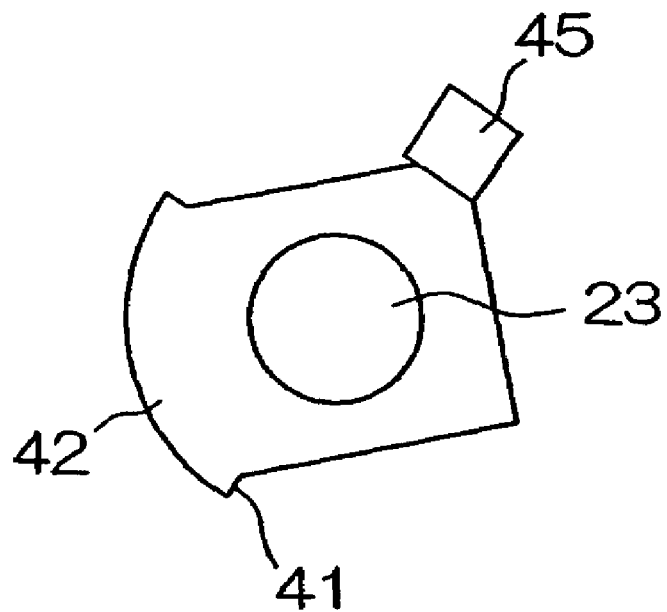
FIG. 8 is a view for explaining an example of variation of the anti-disengagement member.
Figure 9:
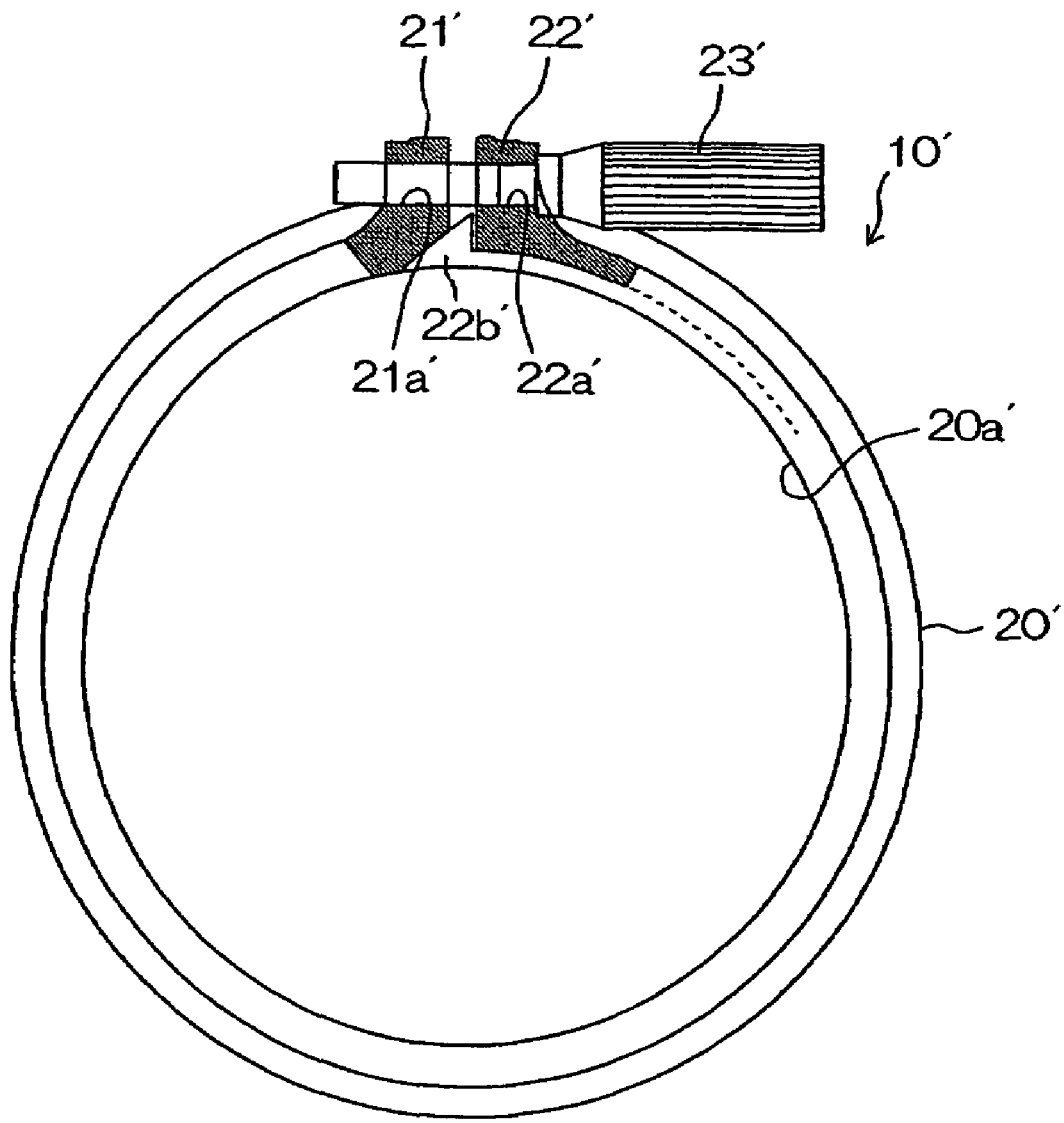
FIG. 9 is a view for explaining the configuration of a conventional optical option attachment ring.

In the above embodiment, although the description has been made of the case where the anti-disengagement member 40 has the large-diameter portion 42 and the small-diameter portion 43, the present invention is not limited thereto. The small-diameter portion 43 may be of any shape as far as it will not project inward from the inner circumferential surface 20a of the ring body 20 when the anti-disengagement member 40 is rotated, as shown in FIG. 5. For example, as shown in FIG. 8, the small-diameter portion 43 may be replaced with a rectangular member.

The above embodiment is presented only by way of example in all respect. The present invention should not be construed in a limiting sense by the above description. The present invention can be implemented in various other forms without departing from the spirit and major features thereof.

What is claimed is:

1. An optical option attachment ring comprising:
a ring body that connects one end to the other end, receives a lens barrel, and has a predetermined gap between the one end and the other end;
a fastening screw that is inserted into screw holes that pass through the one end and the other end;
a rotator having an abutting surface that projects inward from the inner circumferential surface of the ring body and abuts the front end of the lens barrel as well as an arcuate portion that follows the upper end of the abutting surface;
a resilient member that applies an urging force to the rotator such that the rotator rotates in the direction opposite to an insertion direction of the lens barrel; and
a stopper that abuts at least one of the one end and the other end so as to restrict the rotation caused by urging force of the resilient member, wherein
the one end and the other end, the ring body and the fastening screw are configured such that tightening the fastening screw brings the one end and the other end closer to each other and hence the diameter of the ring body decreases so that the optical option attachment ring is fastened to the lens barrel, while loosening the fastening screw separates the one end and the other end from each other and hence the diameter of the ring body increases so that the optical option attachment ring disengages from the lens barrel,
the rotator is configured such that when the lens barrel is inserted into the ring body and moved to a predetermined position, the front end of the lens barrel abuts the abutting surface and the front end of the lens barrel moves relative to the abutting surface so as to rotate the rotator, so that the abutting surface and the arcuate portion are situated outside the inner circumferential surface of the ring body, and
when the lens barrel is inserted into the ring body and moved to the predetermined position, the urging force of the resilient member rotates the rotator so that the abutting surface and the arcuate portion are situated in a groove formed in the lens barrel.

2. The optical option attachment ring according to claim 1, wherein
the rotator is provided with an opening into which the fastening screw is inserted, and the rotator is disposed between the one end and the other end, and rotatably held around the inserted fastening screw.

3. The optical option attachment ring according to claim 1, wherein
the rotator has a small arcuate portion that follows the lower end of the abutting surface and is smaller than the arcuate portion.

4. The optical attachment ring according to claim 2, wherein the rotator has a small arcuate portion that follows the lower end of the abutting surface and is smaller than the arcuate portion.

* * * * *